Patented Aug. 22, 1933

1,923,814

UNITED STATES PATENT OFFICE 1,923,814

NITRIDING

John J. Egan, Brooklyn, N. Y., assignor to Electro Metallurgical Company, a Corporation of West Virginia No Drawing. Application August 11, 1931
Serial No. 556,465

7 Claims. (Cl. 148—16)

My invention relates to the production of surface layers of hard wear-resistant nitrogen-containing materials on ferrous articles, referring more particularly to an improved method for producing such layers.

As ordinarily carried out, the known art of nitriding ferrous articles requires a heating period of from fifteen to ninety hours at temperatures of the order of 450° C. to about 600° C. in a nitriding atmosphere. A method of accelerating and intensifying the nitriding reactions so as to produce a case of given depth and hardness in much less than the usual time is disclosed in U. S. Patent No. 1,808,355 issued to Augustus B. Kinzel on June 2, 1931. This patent discloses a method of accelerating nitriding which depends on the use of inert non-metallic packing materials; and it describes the use of carbon, magnesia, silica, asbestos or alkaline earth oxides. It is the object of my invention to provide a material to be used in a manner similar to that described in the Kinzel patent, and which shows acceleration properties markedly better than the materials therein disclosed.

I have discovered that a particular form of treated silica sand, which I shall herein designate as activated sand, shows remarkable ability to accelerate the nitriding process when used as a packing material for the articles being nitrided.

A typical activated sand as contemplated by this invention is ordinary sea sand which has been subjected to a treatment substantially similar to the following: The sand is treated with fused potassium hydroxide at about 350° C. for about one to two hours, then boiled in hydrochloric acid, then washed and dried. An alternative treatment which produces essentially the same form of sand comprises subjecting the sand to the action of hydrofluoric acid. This material is described by P. G. Nutting, in Science, volume 72, pages 243 and 244, of 1930, in connection with oil adsorption.

Tests which I have made demonstrate that this activated sand may be used as a packing material for articles which are to be nitrided, and when so used accelerates the production of hard nitride cases to a far greater extent than any material heretofore disclosed. Tests show that of the materials disclosed by Kinzel, magnesia produces about the best results. Activated sand is a much better accelerator than magnesia. For example, I subjected specimens of chrome-vanadium steel to the action of ammonia at 460° C. for four hours in a suitable container. One specimen was embedded in magnesia, another in activated sand; and a third was treated in the absence of any packing material. At the end of the four-hour treatment the specimen which had not been embedded in any packing material showed no appreciable nitride case, which was to have been expected from prior experience. The other two specimens were found to have uniform, hard, adherent nitride cases, but the specimen which had been treated with ammonia in the presence of activated sand had a case more than three times thicker and appreciably harder than the case obtained on the specimen embedded in magnesia. The following table shows the actual values obtained in this test:

| Embedding material | Depth of case | Surface hardness |
|---|---|---|
| None | No case | 108 |
| Magnesia | 0.0019 inches | 113 |
| Activated sand | 0.0063 inches | 117 |

In this table, surface hardness is expressed on the Rockwell "B" scale, and depth of case was determined by actual measurements on typical cross-sections.

Tests demonstrate that activated sand is a remarkable accelerator of nitriding when used as a packing material for any nitridable article. It is suitable for use at any nitriding temperature and with any nitriding agent. Although I have described a specific example of the use of activated sand, I do not wish to be limited by any of the specific details, for my invention is capable of application to the process of nitriding generally. I therefore wish to be limited only by the prior art and the appended claims.

I claim:

1. The method of producing nitrogen-containing coatings on a ferrous alloy article which comprises embedding said article in activated silica sand in a suitable container, passing into said container a gaseous substance which will give up nitrogen to the article, and heating.

2. The method of producing nitrogen-containing coatings on a ferrous alloy article which comprises heating said article in contact with activated silica sand and a gaseous nitriding agent.

3. The method of producing nitrogen-containing hard coatings on ferrous articles containing at least one nitride-promoting agent which comprises covering the surface to be hardened with an activated silica sand and heating at a temperature of the order of 450° C. to 600° C. in the presence of a gas containing a nitriding agent.

4. The method of producing nitrogen-containing coatings on ferrous alloy articles which comprises embedding said article in an activated silica sand and heating in the presence of ammonia.

5. The method of producing hard nitrogen-containing coatings on ferrous alloy articles which comprises embedding said articles in an activated silica sand and heating at a temperature of the order of 450° C. to 600° C. in the presence of a gas containing ammonia.

6. The method of accelerating the production of hard nitride cases on ferrous articles by heating with a gas containing ammonia which comprises embedding said articles in activated silica sand and heating with a gas containing ammonia while so embedded.

7. The method of producing a nitrogen-containing coating on a ferrous metal article which comprises heating the article at nitriding temperatures in contact with a gaseous nitriding agent and a material produced by subjecting silica sand to the action of an activating agent of the group consisting of hydrofluoric acid and fused alkali metal hydroxide.

JOHN J. EGAN.